Figure 1:
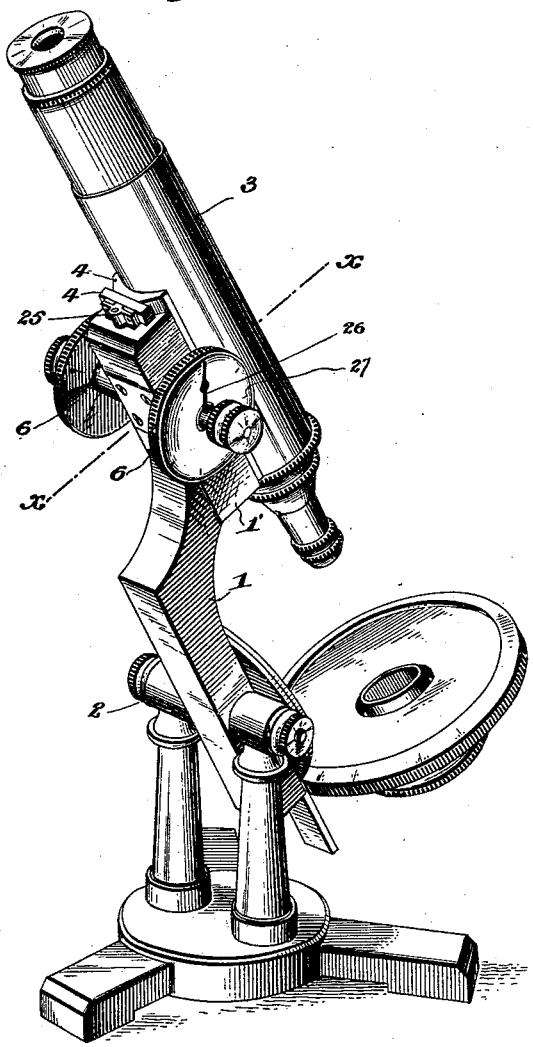

(No Model.) 2 Sheets—Sheet 1.
L. THOMAS.
COMPOUND MICROSCOPE.

No. 475,362. Patented May 24, 1892.

WITNESSES:
David J. Williams.
Chas. C. Collier.

INVENTOR:
Lancaster Thomas,
by Chas. B. Collier,
Atty.

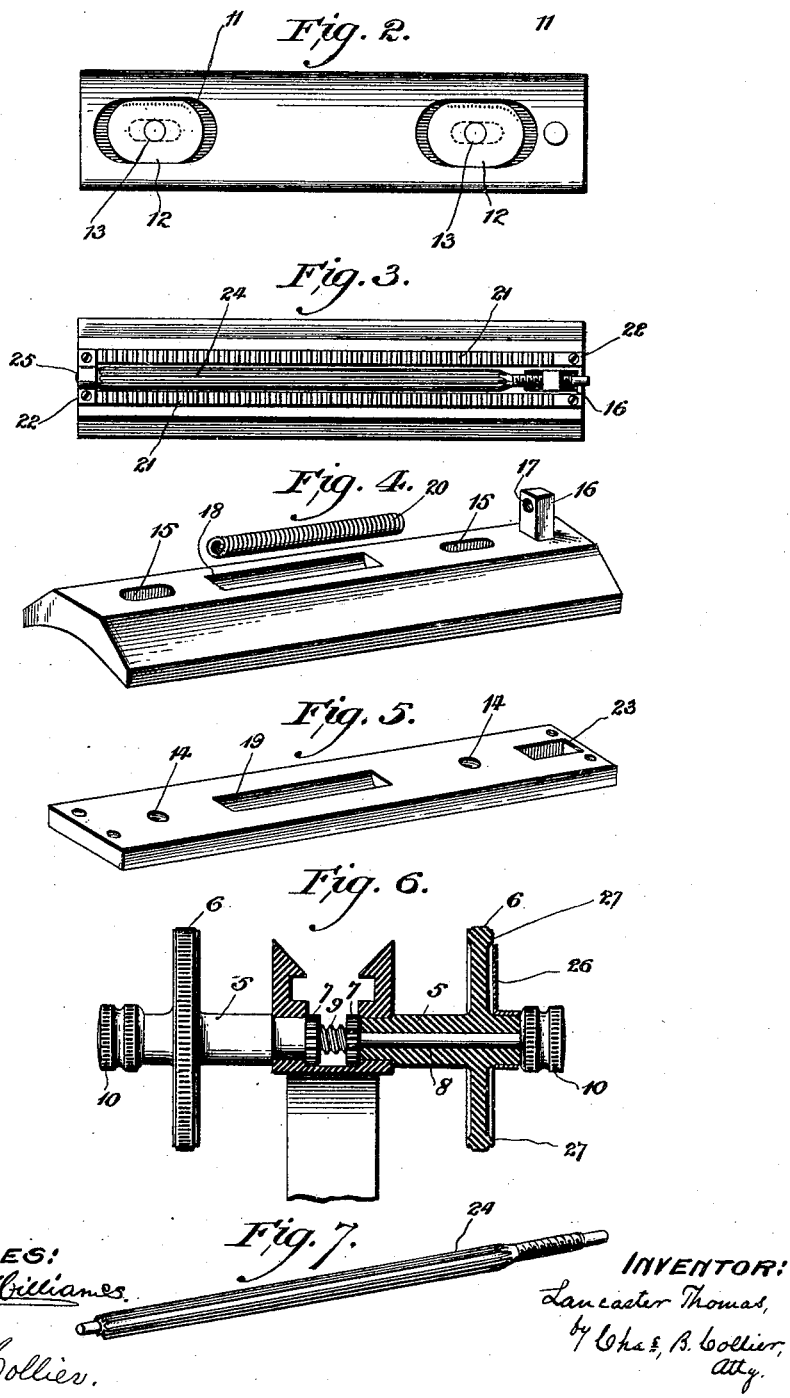

UNITED STATES PATENT OFFICE.

LANCASTER THOMAS, OF PHILADELPHIA, PENNSYLVANIA.

COMPOUND MICROSCOPE.

SPECIFICATION forming part of Letters Patent No. 475,362, dated May 24, 1892.

Application filed March 21, 1892. Serial No. 425,707. (No model.)

*To all whom it may concern:*

Be it known that I, LANCASTER THOMAS, a citizen of the United States, residing at the city of Philadelphia, in the county of Philadelphia and State of Pennsylvania, have invented certain new and useful Improvements in Compound Microscopes, of which the following is a specification, reference being had to the accompanying drawings, in which—
Figure 1 is an elevation in perspective of a compound microscope embodying my improvements. Fig. 2 is a plan view of the compound slide when removed from the arm, the tube being also removed; Fig. 3, an inverted plan of same, showing the pinion-rod in position; Fig. 4, a perspective view of the under side of the upper part of the slide; Fig. 5, a similar view of the upper side of the lower part of the slide; Fig. 6, a sectional view of the arm on the line $x\, x$ of Fig. 1, the slide and tube being removed therefrom; Fig. 7, a detached view of the pinion-rod.

My improvements relate, primarily, to the means of effecting the fine adjustment of the compound microscope, consisting in placing the fine-adjustment shaft through the longitudinal axis of the coarse-adjustment shaft, and incidentally to the construction of the slide and to the index for registering the amount of movement of the micrometer fine adjustment.

Heretofore in the construction of compound microscopes it has been the practice to effect the adjustment or focusing of the instrument by means of racks and pinions, or by means of rack and pinion for the coarse and a lever or spring operated by a micrometer-screw for the fine adjustment, and in all cases, so far as I am aware, the mechanism for effecting the coarse and fine adjustments, respectively, has been placed upon different parts of the instrument, making it necessary for the employment of two separate slides, one for each adjustment, and involving the shifting of the hand of the user of the instrument from one position to another, which interferes oftentimes with its use and is always inconvenient.

By means of my improvements the above objections and disadvantages are removed, the coarse and fine adjustment mechanisms are in immediate proximity to each other, respectively, the direction of motion of the adjusting mechanism, coarse and fine, is the same for corresponding movements of the tube, and a finer adjustment can be effected than is attainable in microscopes as heretofore constructed.

To this end my invention consists in the employment to effect the coarse adjustment of a hollow shaft or two hollow shafts, preferably the latter, operated by means of milled heads upon their outer ends and carrying pinions upon their inner ends, said shafts passing through and having their respective bearings in the opposite walls of the arm, the said pinions engaging with corresponding racks upon the under side of the lower part of the compound slide, and the fine adjustment being effected by means of a shaft passed through the longitudinal axis of the hollow shaft or shafts, and pinions and provided at its center with a screw-thread fixed as an endless screw and provided for rotating it, with milled heads upon its outer ends, the thread upon said central shaft engaging with a pinion-rod supported upon the under side of the lower part of the compound slide, said pinion-rod extending longitudinally with said slide between the racks thereon and being supported loosely, so as to be free to rotate at its outer end, in a bearing on the under side of the lower part of said compound slide and being threaded at its opposite end and screwed into a threaded opening in a lug which depends from the under side of the upper part of the compound slide near its inner end and passes through a slot near the inner end of the lower part of said compound slide. The respective upper and lower parts of said compound slide are united together by screws, which pass through longitudinal slots in the upper part of the compound slide and are provided with caps, which are supported in recesses formed in the said upper part of larger area than said caps. By this arrangement of parts, while the compound slide moves longitudinally as an entirety when actuated by the coarse-adjustment mechanism the upper part alone, carrying with it the tube of the instrument, moves longitudinally when the fine-adjustment shaft is actuated. The extreme inner end of the pinion-rod is a plain surface— that is to say, is not threaded—so that the fine-adjustment screw may not be injured after the slide shall have been moved to the end of the slot. By reversing the motion of the fine-adjustment shaft after the limit of forward motion of the slide has been reached and the thread near the inner end of the pinion-rod has become disengaged from the threaded opening of the depending lug a spiral spring, seated in recesses between the upper and lower parts of the slide, will retract the one upon the other, so that the thread on the pinion-rod will re-engage the threaded opening in the lug referred to.

It is customary in the construction of microscopes as heretofore made to have a fixed index for registering the amount of movement of the micrometer fine-adjustment, which necessitates the reading from an arbitrary figure on the head of the micrometer-screw. In my arrangement of the fine-adjusting mechanism I employ an index-finger, mounted loosely on the sleeve of the fine-adjustment shaft, which is capable of being set at zero to commence each reading. I place my micrometer graduations upon the outer face of the corresponding coarse-adjustment milled head.

Referring to the drawings, 1 1' is the arm, having its axis at 2 on the supporting-standards.

3 is the tube, mounted upon the compound slide.

4 4 represent the compound slide.

5 5 are the shafts of the coarse-adjustment mechanism, 6 6 the milled heads, and 7 7 the pinions on same.

8 is the shaft of the fine-adjustment mechanism, 9 the thread, and 10 10 the milled heads on same.

11 11 are the recesses in the upper part of the slide for the reception of the caps 12 12 of the screws 13 13, which pass through the holes 14 14 in the lower part of the compound slide and through the slots 15 15 in the upper part.

16 is the depending lug, having threaded hole 17 in its lower end for the reception of the threaded end of the pinion-rod.

18 19 are recesses in the lower face of the upper part of the slide and in the upper face of the lower part of same for the reception of the spring 20.

21 21 are the racks on the outer or lower face of the lower part of the slide, which are attached thereto by screws 22.

23 is a slot through the lower part of the slide, through which the lug 16 is passed.

24 is the pinion-rod, the inner threaded end of which is screwed into the threaded hole 17 and the outer end of which has its bearing in the bracket 25.

26 is an index-finger mounted upon a sleeve on the fine-adjustment shaft, and 27 the graduations upon the face of the corresponding head of the coarse-adjustment shaft. It will be seen that the tube of the instrument is carried upon the same bearing, whether actuated by either the coarse or the fine adjustment mechanism.

Having thus described my invention, what I claim, and desire to secure by Letters Patent, is—

In compound microscopes, the combination of one or more hollow shafts provided with pinions and means for rotating the same, a compound slide provided with one or more racks adapted to be actuated by the pinion or pinions on said shaft or shafts, a pinion-rod supported from the under side of said compound slide, and a centrally-threaded shaft passing through the longitudinal axis of said hollow shaft or shafts, the thread of which engages with said pinion-rod, with means for rotating said central shaft, combined and arranged for the purposes and substantially as described.

In testimony whereof I have hereunto affixed my signature, at Philadelphia, on this 12th day of March, A. D. 1892.

LANCASTER THOMAS.

Witnesses:
GEO. W. REED,
CHAS. C. COLLIER.